Oct. 17, 1950 — C. O. WOOD — 2,525,847
LOAD SWITCH FOR BELT CONVEYER SYSTEMS
Filed April 2, 1949
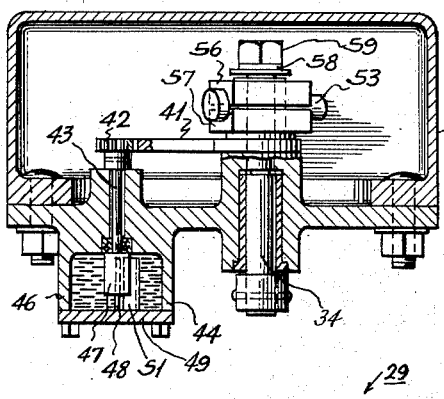
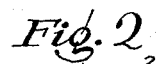
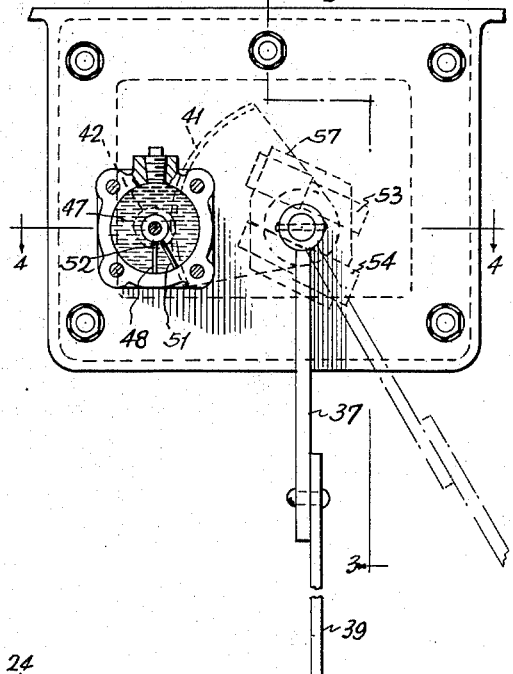
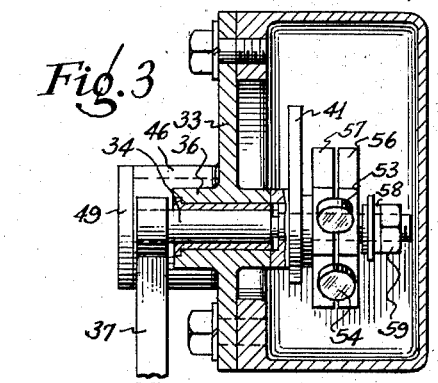
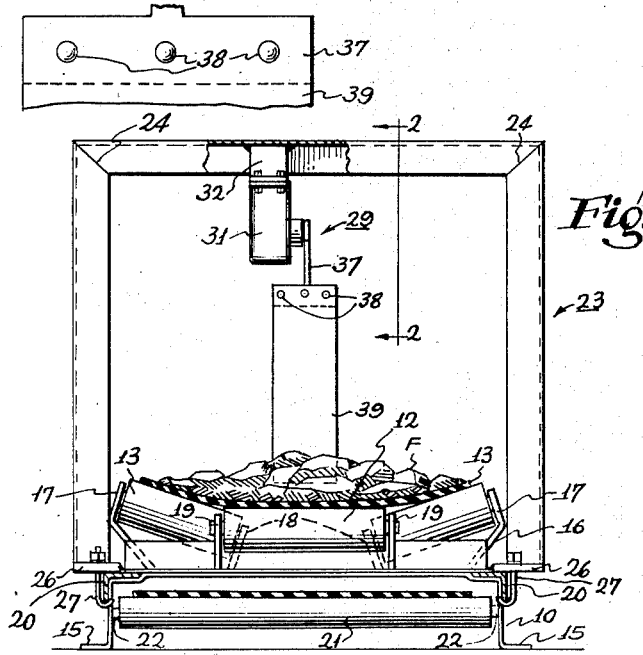
INVENTOR
Claude O Wood
Clarence F. Poole
ATTORNEY Patented Oct. 17, 1950

2,525,847

UNITED STATES PATENT OFFICE 2,525,847

LOAD SWITCH FOR BELT CONVEYER SYSTEMS

Claude O. Wood, Chicago, Ill., assignor to Goodman Manufacturing Company, Chicago, Ill., a corporation of Illinois Application April 2, 1949, Serial No. 85,078

8 Claims. (Cl. 198—37)

This invention relates generally to switches sensitive to loads being transported by conveyor systems, and relates particularly to load indicating or load sensitive switches adapted to be used with conveyor belt systems for transporting fragmentary material varying in size from fine granules to large lumps.

Conveyor belt systems for use in mines are commonly arranged so that lateral or room belt conveyor units are adapted to discharge their contents onto main or gathering conveyors located in the entries. Since the gathering conveyors may be loaded with material received from points inby of the point of discharge of the lateral conveyor onto the main or gathering conveyor, it is necessary to afford some means of control whereby the lateral conveyor is prevented from discharging its contents onto the gathering conveyor when the gathering conveyor is loaded in excess of a predetermined amount. Likewise, it is desirable to continue to operate both the lateral and gathering conveyor units when either of the two units is loaded in excess of a predetermined amount or when both are running under no load. Such a belt conveyor system and the control system therefor is shown in applications Serial Nos. 86,079 and 86,080 of Roger M. Buckeridge, for Belt Conveyor Systems, filed on April 7, 1949.

Heretofore, load indicating switches for controlling circuits in belt conveyor systems have been characterized by being responsive to minor changes in the loaded condition of the belt as might be occasioned by large lumps or fragments interspersed intervally throughout the length of the belt. Thus the load indicating switch would affect a circuit condition when the switch was actuated by a single fragment of coal, rather than being affected by the average loaded condition of the belt.

With the foregoing considerations in mind it is an object of the invention to enable the average load condition only of a belt of a belt conveyor system to affect a load indicating switch in the control circuit for such a system, the load indicating switch being unaffected by minor variations in the load carried by the belt.

Another object is to provide a load indicating switch for a belt conveyor system which will respond to continued loading in excess of a predetermined amount and which will be unresponsive to minor variations in load in excess of a predetermined amount.

Still another object is to afford a load sensitive or load indicating switch for a belt conveyor which will overlie a loaded belt, the switch being provided with a depending load sensing arm which is movable on a shaft in an arcuate path, the movement of the shaft being restrained by a dashpot for minor variations in loaded condition of the belt, and the shaft cooperating with a switch which is actuated by rotation of the shaft by the load sensing arm in accordance with the average loaded condition of the belt.

The foregoing and other objects of the invention will be apparent from a study of the following description and the drawing which illustrate a preferred embodiment of the invention, and what is now considered to be the best mode of applying the principles thereof, the scope of the invention, however, not being limited by the terms of the description and drawing forming a part of this specification, nor otherwise than by the terms of the appended claims.

In the drawing:

Figure 1 is a partly elevational and partly sectional view through a belt conveyor illustrating the load indicator switch according to the present invention;

Figure 2 is an end view of the load indicator switch of Figure 1 looking in the direction of the arrows 2—2 of Figure 1;

Figure 3 is a section taken along the line 3—3 of Figure 2; and

Figure 4 is a section taken along the line 4—4 of Figure 2.

Referring now to Figure 1 of the drawings, there is shown a connector frame 10 in the shape of an inverted pan provided with feet 15 adapted to rest on a mine floor, for a belt 11 of a conveyor belt system. The conveyor belt 11 is moved by drive rollers (not shown), and is guided across a horizontal idler roller 12 and between inclined idling guide rollers 13, 13. The guide rollers 12 and 13 are mounted on the connector frame 10, the connector frame 10 having welded thereto an angle 16, the vertical leg of which has welded thereto brackets 17 and 18 in which the inclined guide rollers 13 are journaled. The other side of the vertical leg of the angle 16 is provided with brackets 19 which are welded thereto, and which have journaled therein the horizontal guide roller 12. The connector frame 10 also supports an idling roller 21 for the return or slack side of the belt 11, the idling roller 21 being journaled at each end as at 22 in the connector frame 10.

The connector frame 10 is one of a number of such frames spaced throughout the length of the conveyor belt 11 for support thereof, connector angles 20 fastened to the frame 10 being provided for maintaining the connector frame 10 in connected and spaced relationship. The details of construction of each connector frame and the means for connecting the connector frames 10 in such spaced relationship are no part of the invention herein except as they are adapted to be modified to provide a support for a load indicating or load sensing switch according to the present invention.

As shown with particular reference to Figure 1, the connector frame 10 is provided with an inverted U-shaped standard 23, preferably consisting of angle members which are welded together as at 24 and which include end plates 26 overlying the connector frame 10 and having passing therethrough hook bolts 27 which engage the stringer angles 20 fastened on each side of the connector frame 10 and connecting the frames 10 together for support of the belt 11.

Depending from a horizontal leg 28 of the inverted U-shaped standard 23 is a load indicating or load sensing switch indicated generally at 29, which includes a casing 31 which is secured to the horizontal leg of the angle 28 by means of a bracket 32 welded thereto. The casing 31 is provided with a closure 33, which has journaled therein a shaft 34 which extends exteriorly of the casing 31 and protrudes from a hollow boss 36 formed in the closure member 33.

The exterior end of the shaft 34 has fast thereto a depending arm 37 which has secured thereto as by rivets 38 a resilient load sensitive portion or finger 39 which is of such dimensions as to contact fragments F carried by the conveyor belt 11, see Figure 1. The resilient load sensitive finger 39 is so arranged as to be moved with the depending arm 37 in a counterclockwise direction to the dotted line position shown in Figure 2 when the belt 11 is loaded to a predetermined height and is transporting fragmentary material F. The resilient finger 39 is of such resiliency that it will permit large fragments which are spaced along the belt 11 to be transported without causing the depending arm 37 to be moved, as will now be described. The end of the shaft 34 which protrudes into the casing 31 has mounted thereon a gear sector 41 which meshes with a pinion 42, see Figure 4, mounted on a shaft 43 which extends into a chamber 44 of a dashpot 46 which is formed as a part of the closure member 33 for the casing 31. The end of the shaft 43 which extends into the chamber 44 has mounted thereon a hub 47 which supports a movable vane 48 which contacts the cylindrical wall of the chamber 44, and also contacts a substantially circular plate 49 which forms a closure for the chamber 44. The inner cylindrical wall of the chamber 44 has extending radially therefrom a fixed vane 51 of such dimension as to provide a small amount of clearance as at 52 between the hub 47 and the fixed vane 51.

The portion of the shaft 34 which extends into the casing 31 supports a pair of mercury switches 53 and 54, which are held in position between a pair of recessed supporting plates 56 and 57, which are mounted on the shaft 34, and which clamp the mercury switches 53 and 54 into position, the clamping pressure being provided by means of a washer 58 and a nut 59 which is threaded to the end of the shaft 34, the nut 59 also serving to hold the gear sector 41 fast to the shaft 34.

The mercury switches 53 and 54 may be so arranged that the switch 53 is closed when the arm 37 is in the solid line position shown in Figure 2, and so that the switch 53 will open when the arm 37 has moved to the dotted line position as shown in Figure 2. Likewise, the switch 54 may be adapted to be opened when the arm 37 is in the solid line position shown in Figure 2 and to be closed when the arm 37 has moved to the dotted line position shown in Figure 2. The choice as to whether the switches 53 and 54 shall be opened or closed upon either of the positions of the arm 37 in Figure 2, may be determined by the circuit conditions desired, as disclosed in Buckeridge application Serial No. 86,079 for Belt Conveyor Systems, filed April 7, 1949.

It will be seen with particular reference to Figure 2 that the free swinging movement of the arm is impeded by the resistance offered to the movable vane 48 in the dashpot 46, since the fluid in the dashpot 46 can only move past the restriction 52 afforded between the hub 47 and the fixed vane 51. It will thus be apparent that the resistance to the movement of the arm 37, afforded by the dashpot 46, will prevent the free swinging movement of the arm 37, at the same time providing for the displacement of the resilient finger 39, which may be displaced at irregular intervals by large fragments interspersed throughout the length of the conveyor belt 11 and transported thereby. It will also be apparent that at such times the height of the load on the belt 11 is such that the load carried thereby will tend to rock the shaft 34 in a counterclockwise direction, that such rocking of the shaft 34 can be achieved only by a continuous load on the belt 11 of such height that the load will be engaged by the resilient finger 39, which will then have been displaced as shown in the dotted line position of Figure 2 by the load beyond a predetermined amount on the conveyor belt 11, since the inherent resiliency of the load sensing finger 39 will rock the arm 37 and the shaft 34 against the impedance of such movement afforded by the dashpot 46.

At such times as the load on the belt 11 is such that it will contact the resilient finger only at points near the lower end thereof, the resistance afforded by the dashpot 46 will prevent such rocking movement of the shaft 34, and the switches 53 and 54 mounted on the shaft 34 will not change in condition. Except for such conditions when the resiliency of the load sensing finger is actually rocking the shaft 34, the weight of the depending arm is sufficient to rock the shaft to the solid line position as seen in Figure 2.

It will be apparent from the foregoing description that there has been provided a load sensitive or load indicating switch which will respond to different conditions of load of a conveyor belt. When the conveyor belt 11 is loaded below a predetermined amount the switch will not be operated because of the resistance to such operation afforded by the dashpot 46. When the load condition on the belt 11 is in excess of a predetermined amount the resiliency of the load sensing finger 39 will cause the shaft 34 to rock against the resistance afforded by the dashpot 46, thereby operating the switches 53 and 54.

While the invention has been described in terms of an embodiment which it may assume in practice, the scope of the invention is not intended to be limited in terms of the embodiment shown, nor otherwise than by the scope of the appended claims.

I claim:

1. In a load indicator switch responsive to the load condition of a belt conveyor transporting fragmented material, a rotatable shaft having an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means opposing the displacement of said rigid arm portion by the resilient portion in being displaced by large fragments of said material, and switch means adapted to be operated by displacement of said rigid arm portion.

2. In a load indicator switch responsive to the load condition of a belt conveyor transporting fragmented material, a rotatable shaft having an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means comprising a dashpot having a movable vane connected to said shaft and adapted to be rotated thereby for opposing the displacement of said rigid arm portion by the resilient portion in being displaced by large fragments of said material, and switch means adapted to be operated by displacement of said rigid arm portion.

3. In a load indicator switch responsive to the load condition of a belt conveyor transporting fragmented material, a rotatable shaft having an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means opposing the displacement of said rigid arm portion by the resilient portion in being displaced by large fragments of said material, and switch means carried by said rotatable shaft adapted to be operated by displacement of said rigid arm portion.

4. In a load indicator switch responsive to the load condition of a belt conveyor transporting fragmented material, a rotatable shaft having an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means comprising a dashpot having a movable vane connected to said shaft and adapted to be rotated thereby for opposing the displacement of said rigid arm portion by the resilient portion in being displaced by large fragments of said material, and switch means carried by said rotatable shaft adapted to be operated by displacement of said rigid arm portion.

5. In combination with a belt conveyor for transporting fragmentary material, a frame adapted to be mounted on said belt conveyor and having a limb overreaching the belt of said conveyor, a load indicator switch responsive to the load condition of said belt conveyor adapted to be secured to said overreaching limb, and having a rotatable shaft including an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means opposing the displacement of said rigid arm portion by the resilient portion in being displaced by large fragments of said material, and switch means adapted to be operated by displacement of said rigid arm portion.

6. In combination with a belt conveyor for transporting fragmentary material, a frame adapted to be mounted on said belt conveyor and having a limb overreaching the belt of said conveyor, a load indicator switch responsive to the load condition of said belt conveyor adapted to be secured to said overreaching limb and having a rotatable shaft including an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means comprising a dashpot having a movable vane connected to said shaft and adapted to be rotated thereby for opposing the displacement of said rigid arm portion by the resilient portion in being displaced by large fragments of said material, and switch means adapted to be operated by displacement of said rigid arm portion.

7. In combination with a belt conveyor for transporting fragmentary material, a frame adapted to be mounted on said belt conveyor and having a limb overreaching the belt of said conveyor, a load indicator switch responsive to the load condition of said belt conveyor adapted to be secured to said overreaching limb, and having a rotatable shaft including an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means opposing the displacement of said rigid arm portion by the resilient portion in being displaced by large fragments of said material, and switch means carried by said rotatable shaft adapted to be operated by displacement of said rigid arm portion.

8. In combination with a belt conveyor for transporting fragmentary material, a frame adapted to be mounted on said belt conveyor and having a limb overreaching the belt of said conveyor, a load indicator switch responsive to the load condition of said belt conveyor adapted to be secured to said overreaching limb, and having a rotatable shaft including an arm depending therefrom adapted to be contacted by material carried by said conveyor belt, said arm comprising a resilient portion adapted to be displaced by large fragments interspersed throughout the length of said belt conveyor and a rigid portion adapted to be displaced upon loading of said belt in excess of a predetermined amount, fluid means comprising a dashpot having a movable vane connected to said shaft and adapted to be rotated thereby for opposing the displacement of said rigid arm portion by the resilient portion in being displaced by large fragments of said material, and switch means carried by said rotatable shaft adapted to be operated by displacement of said rigid arm portion.

CLAUDE O. WOOD.

No references cited.